United States Patent
Sadiku et al.

(10) Patent No.: US 7,385,331 B2
(45) Date of Patent: Jun. 10, 2008

(54) STATOR FOR ELECTRIC MACHINES

(75) Inventors: Sadik Sadiku, Neuberg (DE); Keith A. Witwer, Fort Wayne, IN (US)

(73) Assignee: Elmotec Statomat Vertriebs GmbH, Karben (DE)

( * ) Notice: Subject to any disclaimer, the term of this patent is extended or adjusted under 35 U.S.C. 154(b) by 556 days.

(21) Appl. No.: 11/182,748

(22) Filed: Jul. 18, 2005

(65) Prior Publication Data

US 2006/0012260 A1  Jan. 19, 2006

(30) Foreign Application Priority Data

Jul. 16, 2004 (DE) .................... 10 2004 034 526

(51) Int. Cl.
*H02K 1/16* (2006.01)
(52) U.S. Cl. ...................... 310/179; 310/216
(58) Field of Classification Search ................ 310/216, 310/179, 180, 214, 215
See application file for complete search history.

(56) References Cited

U.S. PATENT DOCUMENTS

| | | | | |
|---|---|---|---|---|
| 5,359,249 A | * | 10/1994 | Tanaka | 310/216 |
| 6,137,201 A | * | 10/2000 | Umeda et al. | 310/179 |
| 6,337,529 B1 | | 1/2002 | Higashino et al. | 310/254 |
| 6,459,186 B1 | * | 10/2002 | Umeda et al. | 310/208 |
| 6,559,572 B2 | * | 5/2003 | Nakamura | 310/254 |
| 6,713,928 B2 | * | 3/2004 | Takizawa et al. | 310/214 |
| 7,141,908 B2 | * | 11/2006 | Holmstrom et al. | 310/254 |
| 2002/0175589 A1 | | 11/2002 | Takizawa et al. | 310/180 |
| 2004/0261885 A1 | | 12/2004 | Sadiku | 140/92.1 |
| 2006/0012260 A1 | * | 1/2006 | Sadiku et al. | 310/179 |
| 2006/0022547 A1 | * | 2/2006 | Sadiku et al. | 310/206 |

FOREIGN PATENT DOCUMENTS

| | | |
|---|---|---|
| DE | 101 41 802 A1 | 8/2001 |
| GB | 2 260 860 A | 4/1993 |
| JP | 2001-298882 | 10/2001 |

* cited by examiner

*Primary Examiner*—Karl I Tamai
(74) *Attorney, Agent, or Firm*—Stites & Harbison PLLC; Douglas E. Jackson

(57) ABSTRACT

The stator for electrical machines has stator slots that are open radially inward, at least some of which contain coils made from round wire and have side walls (10, 12) of equal length that each extend parallel to their center radial plane. To attain an especially high fill factor, the entrances (16) of the stator slots have a width, measured transversely to their center radial plane, that is slightly greater than the diameter d of the round wire (18). A further condition is that the width of the stator slots, measured between the parallel side walls (10, 12), amounts to (1+cos 30°)d, and the radially outer slot wall (14) forms angles of 60° and 120°, respectively, with each of the two side walls (10, 12).

5 Claims, 1 Drawing Sheet

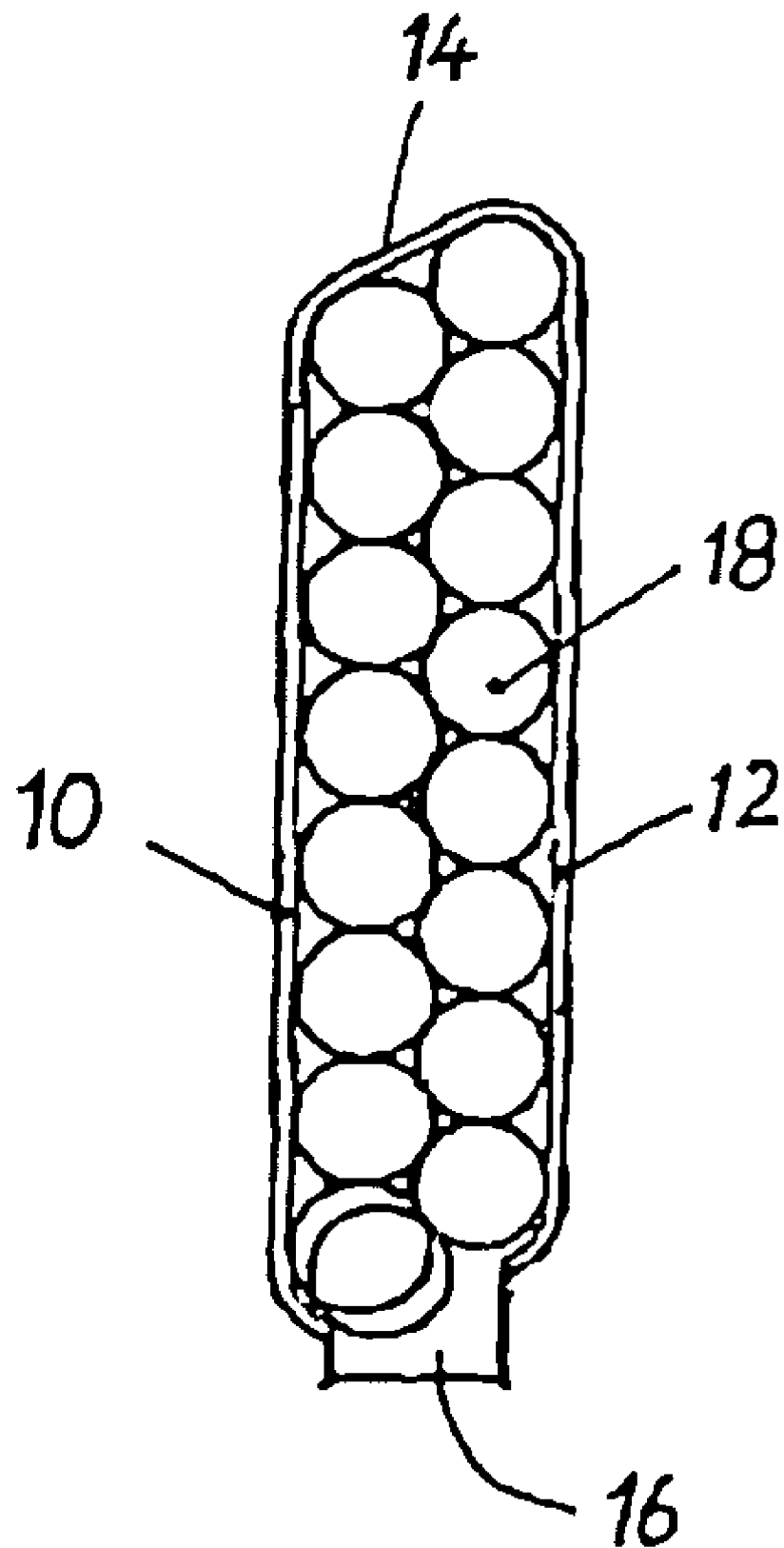

STATOR FOR ELECTRIC MACHINES

The invention relates to a stator for electrical machines, in particular motor vehicle generators, with stator slots that are open radially inward, at least some of which contain coils made from round wire and have side walls of equal length that each extend parallel to their center radial plane.

With a view to efficiency, attempts are made to fill the cross section of the stator slots with coil wire as extensively as possible, or in other words to attain as high a fill factor as possible. To that end, it is known from European Patent Disclosure EP 1 120 881 A2 to bend the stator into a round shape from a straight toothed strip, once a coil winding of rectangular wire has been placed in the stator slots in such a way that only one radially oriented row of wire cross sections is located in the cross section of each stator slot. This way of producing a stator results in very high costs.

In German Patent Application 103 28 955.0, a stator has already been proposed with a coil winding of round or rectangular wire that is received in stator slots in each of which two wires are located side by side. Only if expensive rectangular wire is used is a high fill factor attained in that case. Conversely, if for cost reasons round wire with a wire diameter d is used, then the width of the slot must be somewhat greater than 2d, so that a relatively large proportion of the volume of a slot remains empty.

The object of the invention is to create a stator in which by simple means, using round wire, a markedly higher fill factor can be attained.

This object is attained according to the invention in that the entrances of the stator slots have a width, measured transversely to their center radial plane, that is slightly greater than the diameter d of the round wire; the width of the stator slots, measured between the parallel side walls, amounts to $(1+\cos 30°)d$; and the radially outer slot wall forms angles of 60° and 120°, respectively, with each of the two side walls. The result is accordingly a slot of asymmetrical cross section, relative to the center radial plane.

With the slot form proposed, the first wire introduced into the slot and pressed radially outward must occupy a very specific position in the radially outermost corner of the slot. The next wire pressed into the stator slot must rest on the other side of the stator slot against the circumference of the first wire. The third wire places itself radially precisely in front of the first, the fourth wire does the same in front of the second, and so forth. It can be seen that each maximally radially outward-thrust wire must occupy a defined position, in which in terms of cross section, the connections of the center points of each three wires successively introduced into the stator slot form an equilateral triangle. This is the tightest packing of round wires that can be achieved, and stator slots with the width indicated, together with the wires already introduced, form a travel limitation, upon radial insertion of each further wire, that guides that wire into the radially outermost position intended for that wire.

To keep the slot cross section, intended for receiving a defined number of coil windings, as small as possible, it is provided in a further preferred feature of the invention that the corners that the side walls form with the radially outer slot wall are rounded with a radius of ½ d. Expediently, the radially offset transitions from the side walls to the slot entrance are also rounded with a radius of ½ d.

The slot entrance will normally be located such that the center radial plane of the slot also extends through the center of the slot entrance. However, the possibility also exists of shifting the center of the slot entrance, relative to the center radial plane of the slot, a little to the side on which the radially outer slot wall forms the angle of 60° with the one side wall. In this version, the last wire thrust into the slot is restrained in the slot even better, by somewhat, than in the case of a central location of the slot entrance.

It is understood that d here in each case designates the outer diameter of the wire, including its insulation. If the walls of the stator slots, or their entrance region, are to be lined with an insulation, then the resultant reduction in the size of the slot cross section must be taken into account accordingly in designing the dimensions, in terms of the number and size of wires to be received. The slot entrance should be slightly larger in size than d, so that the wires can be introduced perfectly into the slot.

One exemplary embodiment of the invention is shown in the accompanying drawing. The stator slot shown in cross section there has two side walls 10, 12 and a radially outer slot wall 14. The slot entrance is marked 16. In this example, the slot is intended to receive 16 round winding wires 18. The radially outer slot wall 14, together with the side wall 12, forms an angle of 60° in the interior of the slot. However, the corner is rounded with the radius d/2 of the wires 18, so that the radially outermost wire conforms closely to the rounded corner. In a corresponding way, the corner formed between the radially outer slot wall 14 and the side wall 10, which form an angle of 120°, is also rounded with a radius of d/2. The width of the stator slot between the two side walls 10 and 12 amounts to $(1+\cos 30°)d$, so that in the finished state of the stator, the wires can be located in only two rows, radially relative to the wires of the respective other-row so as to fill gaps, and can rest, tightly packed, between the two side walls 10, 12.

The offset arrangement of the winding wires extends as far as the transitions from the equal-length side walls 10, 12 to the slot entrance 16. Accordingly, the transition from the side wall 10 to the slot entrance 16 is located radially farther inward than the transition from the side wall 12 to the slot entrance 16. Because of the radially offset position of the transitional regions from the side walls 10 and 12 to the slot entrance 16, the last wire to be received by the slot can also be inserted, even though the slot entrance 16 is only slightly wider than the wire diameter.

In order, upon introduction of the wires into the slot, to assure that they each find the radially outermost free position intended for them in the slot, alternatingly on the right and left sides of the slot, it may be recommended that the stator lamination packet and/or the tappet that pushes the wires radially outward in the slot be set to vibrating during the introduction process. Another possibility would be to design the tappet in such a way, for instance by division in the radial center plane and radial displacement of the two halves relative to one another, that it exerts a pressure on the wires that is selectively oriented more to the right or more to the left. Advantages can also be obtained if with one tappet stroke, an even number of wires is thrust in succession through the slot entrance 16 into the slot, and the radially outermost edge of the tappet is embodied with the same slant as the radially outer slot wall 14.

The invention claimed is:

1. A stator for electrical machines, in particular motor vehicle generators, with stator slots that are open radially inward, at least some of which contain coils make from round wire and have side walls (10, 12) of equal length that each extend parallel to their center radial plane, characterized in that the entrances (16) of the stator slots have a width, measured transversely to their center radial plane, that is slightly greater than the diameter d of the round wire (18); the width of the stator slots, measured between the parallel side walls (10, 12), amounts to (1+cos 30°)d; and the radially outer slot wall (14) forms angles of 60° and 120°, respectively, with each of the two side walls (10, 12).

2. The stator according to claim 1, characterized in that the corners that the side walls (10, 12) form with the radially outer slot wall (14) are rounded with a radius of ½ d.

3. The stator according to claim 1, characterized in that the radially offset transitions from the side walls (10, 12) to the slot entrance (16) are rounded with a radius of ½ d.

4. The stator according to claim 1, characterized in that the center radial plane of the slot extends through the center of the slot entrance (16).

5. The stator according to claim 1, characterized in that the center of the slot entrance (16) is located beside the center radial plane of the slot on the side on which the radially outer slot wall forms the angle of 60° with the one side wall (12).

* * * * *